UNITED STATES PATENT OFFICE.

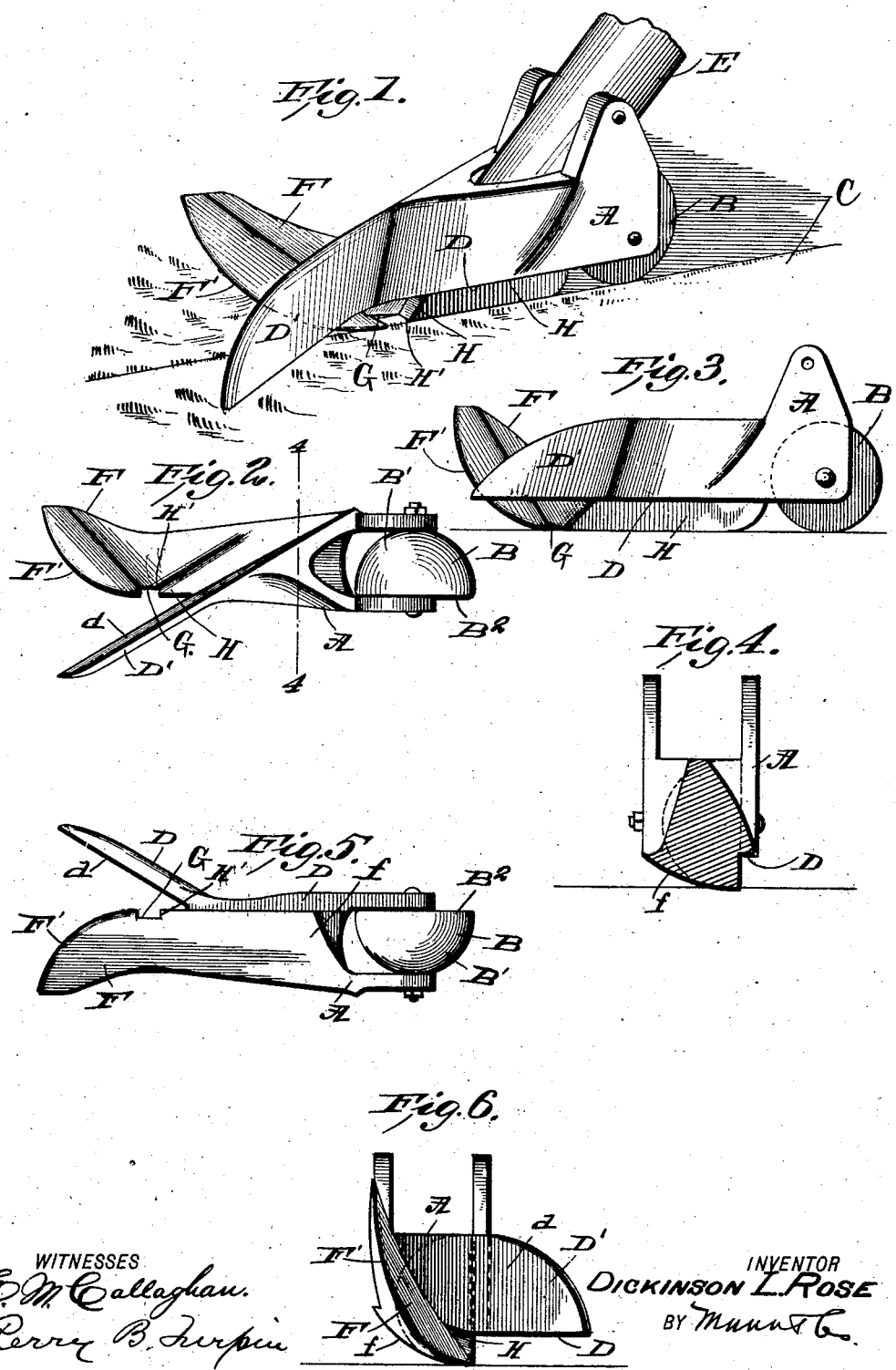

DICKINSON LOGAN ROSE, OF MANKATO, MINNESOTA.

SOD OR WALK TRIMMER.

No. 850,057.  Specification of Letters Patent.  Patented April 9, 1907.

Application filed August 30, 1906. Serial No. 332,599.

*To all whom it may concern:*

Be it known that I, DICKINSON LOGAN ROSE, a citizen of the United States, and a resident of Mankato, in the county of Blue Earth and State of Minnesota, have made certain new and useful Improvements in Sod or Walk Trimmers, of which the following is a specification.

My invention is a sod-trimmer designed especially for trimming sod from along a sidewalk, such as cement sidewalks, but which can also be used to advantage in trimming sod along flower-beds and the like; and the invention consists in certain novel constructions and combinations of parts, as will be hereinafter described and claimed.

In the drawings, Figure 1 is a perspective view of my invention as in use. Fig. 2 is a top plan view. Fig. 3 is a side view taken from the left-hand side of the device. Fig. 4 is a cross-section on about line 4 4 of Fig. 2. Fig. 5 is a bottom plan view of the device, and Fig. 6 is a front view of the device.

The trimmer, as shown, comprises the body A, which is bifurcated at its rear end to receive the roller B, which roller is tapered or made conical with its sloping side B' toward the landside of the device and having the flat side B² to move alongside the edge of the sidewalk C, as shown in Fig. 1. On its under side the body A is provided with a longitudinally-extended lateral shoulder D, which in practice rests upon the sidewalk C and is prolonged at its front end and extended, forming a laterally and forwardly projecting tongue D', which extends at an angle over the sidewalk and operates as a guide-gage and walk-scraper in the use of the invention. The inner surface d of this tongue D' operates to deliver into the excavation formed by the cutting-blade F, presently described, the earth, &c., which may have been discharged by the said blade onto the sidewalk. I prefer to employ this walk-scraper D', as it aids in keeping the walk clean during the operation; but, it will be understood, where desired this blade may be omitted, and in such case I would prefer to secure the handle E rigidly to the body in order to obtain the desired leverage on the wheel B, and it may be preferred to so secure the handle in all cases.

On the landside of the body I provide at its front end the cutting-blade F, whose edge F' inclines forwardly and laterally and operates to shear off the sod for a short distance away from the edge of the sidewalk to preserve a neat finish at such point as desired. The landside-surface of the body A is sloped in rear of the blade F at f, conforming to and pressing against the base-wall of the excavation formed by the said cutter F to smooth and finish the excavation, and the conical surface B' of the wheel also conforms to said wall of the excavation and operates in practice to roll the same smooth and give it a neat finish, as desired. At the rear lower edge of this cutting-blade F, I provide a notch or cut portion G and in rear thereof a blade H, whose edge H' projects down below the level of the sidewalk and extends laterally and operates to thoroughly clean the grass and roots out of the excavation formed by the cutting-blade F as the tool is pushed forward.

While, as suggested, the lateral guide-gage D' might be omitted and the tool simply comprise the cutting-blade F, the scraper H, and the guiding-wheel and handle, it will be understood that it is preferred to construct the tool as shown and before described.

In operation when the tool is applied as shown in Fig. 1 and moved alongside the walk it will efficiently trim the sod and by the inner inclined face d of the guide-gage D' throw all dirt and the like beyond the excavation formed by the cutters.

I claim—

1. A sod or walk trimmer, comprising a body portion having a wheel at its rear end, and provided at its front end with a laterally-projecting upwardly-inclined cutting-blade, having on its under side a laterally-projecting longitudinal extended shoulder to rest upon a guide-surface and having said shoulder prolonged laterally and forwardly forming a guide and scraper tongue, and provided in rear of the front cutting-blade with a scraper whose edge projects below the guide-shoulder and extends transversely, substantially as and for the purposes set forth.

2. A sod or walk trimmer comprising a body having at one side a cutting-blade set at an angle to which it is desired to cut or trim the sod or earth, and having at its opposite side a lateral projection forming a guide and gage and adapted to rest on a guiding-surface such as a cement walk, said guide being prolonged forwardly and inclined laterally to one side of the body substantially as set forth.

3. A sod or walk trimmer, comprising a body portion having its under side provided with a guide-shoulder to rest upon a sidewalk, having said shoulder prolonged forwardly and laterally to one side of the body portion, and having a cutting-blade projecting laterally to the opposite side of the body portion from the lateral extension of the shoulder, substantially as set forth.

4. A sod cutter or trimmer, comprising a body portion having at its front end a cutting-blade at one side and provided at its opposite side with a guide-gage and scraper extending at an angle to the line of movement of the device, and adapted to discharge accumulations to the cutting side of the tool in rear of the cutting-blade, substantially as set forth.

5. A sod cutter or trimmer, comprising an upwardly-inclined blade to trim the sod and provided in rear of and at the lower edge of the said blade with a transverse plow or scraper and also having an inclined scraper extending in rear of the transverse scraper and projecting at its respective ends in advance and in rear of said transverse scraper, substantially as set forth.

6. A sod cutter or trimmer, comprising a body portion having at its front end an inclined cutting-blade and provided in rear thereof with an inclined surface conforming to the excavation made by said blade and adapted to press against and smooth the surface of said excavation, substantially as set forth.

7. A sod cutter or trimmer, comprising a body portion having at its front end a cutting-blade inclined transversely to the direction of movement of the cutter and in rear thereof a surface conforming generally at an inclination to said blade and adapted to compress the wall of the excavation formed by the blade, and a wheel or roller in rear of said surface and having its side sloped or inclined generally in conformity with said inclined surface and adapted to roll and finish the said wall of the excavation, substantially as set forth.

8. A sod or walk trimmer having a body portion provided at its front edge with a cutting-blade and having in rear of said blade a surface conforming approximately to the cutting-blade to smooth the wall of the excavation formed by said blade, and also having in rear of said smoothing-surface a roller conforming to said wall of the excavation and adapted to smoothly roll the surface thereof, substantially as set forth.

9. A sod or walk trimmer, comprising a body portion having a cutting-blade at its front end, adapted to form an excavation along the edge of a sidewalk, and a roller in rear of said blade and adapted to finish the surface of the wall formed by said excavation, substantially as set forth.

10. A sod or walk trimmer for hand use, comprising a body portion having a cutting-blade at its front edge, and a wheel or roller at its rear edge and provided with an upwardly-projecting handle whereby it may be operated, substantially as set forth.

DICKINSON LOGAN ROSE.

Witnesses:
 JNO. C. NOE,
 BESSIE DACKINS.